(12) United States Patent
Leister et al.

(10) Patent No.: US 8,661,852 B2
(45) Date of Patent: Mar. 4, 2014

(54) DEVICE AND METHOD FOR THE CONTINUOUS FINING OF GLASSES WITH HIGH PURITY REQUIREMENTS

(75) Inventors: Michael Leister, Budenheim (DE); Volker Ohmstede, Bingen (DE); Guenter Weidmann, Flonheim (DE)

(73) Assignee: Schott AG (DE)

( * ) Notice: Subject to any disclaimer, the term of this patent is extended or adjusted under 35 U.S.C. 154(b) by 611 days.

(21) Appl. No.: 12/160,866

(22) PCT Filed: Dec. 4, 2006

(86) PCT No.: PCT/EP2006/011611
§ 371 (c)(1),
(2), (4) Date: Jun. 10, 2010

(87) PCT Pub. No.: WO2007/087856
PCT Pub. Date: Aug. 9, 2007

(65) Prior Publication Data
US 2011/0034316 A1  Feb. 10, 2011

(30) Foreign Application Priority Data
Jan. 24, 2006  (DE) .......................... 10 2006 003 521

(51) Int. Cl.
*C03B 5/167* (2006.01)
*C03B 5/225* (2006.01)

(52) U.S. Cl.
CPC .............. *C03B 5/1672* (2013.01); *C03B 5/225* (2013.01)
USPC ........................................... 65/134.1; 65/346

(58) Field of Classification Search
CPC ............................... C03B 5/1672; C03B 5/225
USPC ................. 65/134.1, 135.9, 324, 346; 501/94
See application file for complete search history.

(56) References Cited

U.S. PATENT DOCUMENTS

| 5,785,726 A | 7/1998 | Dorfeld et al. | |
| 6,422,861 B1 * | 7/2002 | Antczak et al. | ................. 432/13 |

(Continued)

FOREIGN PATENT DOCUMENTS

| DE | 199 39 773 A1 | 2/2001 |
| DE | 101 46 884 A1 | 12/2002 |
| DE | 10348466 A1 | 5/2005 |
| EP | 1160208 A2 | 5/2001 |

(Continued)

OTHER PUBLICATIONS

Dr. Poetschke, "German Patent Application DE 10 2006 003 521.6 Office Action", Jul. 14, 2009, Published in: DE.

(Continued)

*Primary Examiner* — Matthew Daniels
*Assistant Examiner* — Cynthia Szewczyk
(74) *Attorney, Agent, or Firm* — Kaplan, Breyer, Schwarz & Ottesen, LLP

(57) ABSTRACT

The present invention relates to a device and to a method for the continuous fining or homogenizing of inorganic matter, preferably low-viscosity glass melts in an apparatus. The device and method are distinguished in that the inclusion of bubbles and the occurrence of striations in the glass end product are significantly reduced or even entirely avoided when the melt contact surface of the apparatus has iridium or a high-iridium alloy as its material.

29 Claims, 9 Drawing Sheets

(56) References Cited

U.S. PATENT DOCUMENTS

| | | |
|---|---|---|
| 2002/0174688 A1 | 11/2002 | Murakami et al. |
| 2005/0109062 A1* | 5/2005 | Stelle et al. ............... 65/32.1 |
| 2006/0242995 A1* | 11/2006 | Bookbinder et al. ........ 65/134.1 |
| 2006/0242996 A1 | 11/2006 | DeAngels et al. |
| 2007/0022780 A1* | 2/2007 | House et al. ............... 65/29.21 |

FOREIGN PATENT DOCUMENTS

| | | |
|---|---|---|
| EP | 1 524 243 A1 | 4/2005 |
| JP | 02022132 | 1/1990 |
| JP | 2005119959 A | 5/2012 |
| WO | 02/42230 A2 | 5/2002 |
| WO | 02/44115 A2 | 6/2002 |
| WO | 2006/115997 A2 | 11/2006 |

OTHER PUBLICATIONS

Yolaine Cussac, "International Application No. PCT/EP2006/011611 International Preliminary Report on Patentability", Oct. 9, 2008, Publisher: PCT, Published in: PCT.

Ryusuke Okada, "JP Application No. 2008-551660 Office Action", Jul. 9, 2012, Publisher: JPO, Published in: JP.

"Related Korean Patent Application No. 7018288/2008 Office Action", Apr. 17, 2013, Publisher: Korean Intellectual Property Office, Published in: KR.

* cited by examiner

DEVICE AND METHOD FOR THE CONTINUOUS FINING OF GLASSES WITH HIGH PURITY REQUIREMENTS

DESCRIPTION OF THE INVENTION

The present invention relates to a device and a method for the continuous fining of highly pure low-viscosity glass melts in an apparatus.

BACKGROUND OF THE INVENTION

For the quality of glasses for optical applications, in particular optical glasses, fiber-optical glasses, display glasses and/or technical glasses with stringent requirements, the absence of gas inclusions or gas bubbles and a minimum of discoloring inclusions are crucial for the unperturbed transmission of electromagnetic radiation. Furthermore, the quality of a glass is essentially influenced by its homogeneity and the absence of striations. Toxic substances or at least substances which are for concern for health or ecologically, for example silicon or antimony, should be avoided as much as possible.

In the first process step of glassmaking the starting substance, the so-called batch, is melted. After the batch has become viscously fluid owing to increase in temperature, the homogenization slowly begins, i.e. the dissolving and uniform distribution of all constituents of the melt and the elimination of striations. Initial fining likewise commences, i.e. the removal of gas bubbles from the glass melt, which is continued in further special fining steps.

Although melting and fining in the same apparatus is the most economical fining method, it is employed only for technical glasses with relatively low demands on the proportion of bubbles since the residual bubble content in this method is relatively high.

In contrast to the method described above, in continuously operated melting methods glasses with more stringent requirements, for example optical, fiber-optical or technical glasses are conventionally fined in special fining chambers or fining apparatus made of platinum or platinum alloys, in order to obtain them bubble-free. The platinum used as cladding material or bulk material is on the one hand very cost-intensive, and on the other hand apparatus made of platinum or platinum alloys have the disadvantage that small amounts of Pt or other alloy constituents are released into the melt owing to the corrosiveness and in part reactivity of the glass melts. Depending on the redox state of the glass, these alloy constituents will be present in ionic form, for example as the $Pt^{4+}$ ion or $Rh^{4+}$ ions, or as colloidal particles finely distributed in elementary form in the glass end product. Depending on the concentration and/or particle size in the glass end product, this introduction of ionic or elementary metal into the glass melt may lead to undesired discoloration and reduced transmission of electromagnetic radiation, not only in the visible range.

Another possible way to improve the fining of the glass and shorten the fining time consists in using high fining temperatures. Increasing the temperature during the fining will inter alia reduce the viscosity of the glass melt and thereby increase the rate of ascent of the bubbles present in the glass melt.

At elevated fining temperatures, particularly above 1550° C. or when fining corrosive glasses, increased attack of the apparatus wall by the glass leads to increased introduction of material into the glass melt and therefore into the glass end product. Furthermore, there is also a detrimental restriction in respect of high fining temperatures since apparatus made of platinum can be used only up to a temperature of at most 1600° C. and apparatus made of PtRh10, an alloy which consists of 90 wt. % platinum and 10 wt. % rhodium, can be used only up to at most 1700° C. The high input of material leads to a strong yellow coloration of the glass. Apparatus made of PtRh20, an alloy which consists of 80 wt. % platinum and 20 wt. % rhodium, can be used up at most 1800° C., which likewise leads to a strong yellow coloration of the glass. Apparatus made of $ZrO_2$-stabilized platinum can be used only up to 1650° C.

A further avenue for optimizing the fining resides in the use of chemical fining agents. The principle of this method consists in adding constituents to the batch, which decompose in the melt at high temperatures to evolve or release gas, generally oxygen. The gas released by the fining agents absorbs the gases contained in the melt, creating bubbles that grow as the fining time increases, which more rapidly ascend to the surface of the melt and therefore leave the melt.

Inter alia, the choice of the fining agents depends on the temperature of the glass melt during the fining since the evolution of gas or decomposition of the various fining agents take place at different temperatures. For example the fining agent arsenic pentoxide, $As_2O_5$, already decomposes by cleaving oxygen at a temperature above 1250° C. into arsenic oxide, $As_2O_3$, which remains in the glass melt and is therefore contained in the glass end product. Conversely a so-called high-temperature fining agent, for example $SnO_2$, is only to be used at a temperature above 1500° C. $SnO_2$ decomposes above temperatures of 1500° C. into $SnO$ and ½ $O_2$. The oxides formed remain for the most part in the melt and are detectable in the glass end product. Arsenic present in the glass end product is particularly disadvantageous when ecologically and health-safe glasses are desired. There is therefore a pressing need for possible ways of fining at high temperatures, in order to be able to carry out the fining more efficiently so as to obtain a product with the least possible bubbles.

Document U.S. Pat. No. 6,632,086 B1 describes a glass melting crucible which makes it possible to carry out fining of the glass at temperatures of up to 2350° C. Owing to better, solubility of gases in the starting material, operating the device at such high temperatures leads to less bubble defects, less discolorations and minimal formation of striations. The device comprises a body made of ceramic refractory material, which is coated on the side facing the glass with a 0.25 mm to 1.27 mm thick nonreactive boundary layer of rhenium, osmium, iridium or a mixture thereof.

As described above, bubbles present in the glass melt not only have their origin in the starting products, rather they may also be due to thermal dissociation of water contained in the melt.

The documents described below deal with this phenomenon of bubble formation.

Document WO 02/44115 A2 describes a coated metal part for glassmaking, which has a layer impermeable to $H_2$ or $H_2$ and $O_2$ on the other side from the glass melt. As a function of the temperature, the water present in the glass melt dissociates into hydrogen and oxygen. While hydrogen can diffuse through the wall material, this is not possible for the oxygen being formed owing to its size. The effect of the hydrogen diffusion is that an equilibrium state between hydrogen and oxygen is no longer achieved in the melt, such that water would form again when cooling the melt. If the $O_2$ concentration in the melt finally exceeds the solubility limit at an $O_2$ partial pressure of about 1 bar, then bubbles containing $O_2$ will be formed. The bubbles grow even more owing to the diffusion of $SO_2$, $N_2$, $CO_2$, and other gases physically dissolved in the glass, into them during cooling and they are detectable in the finished product. This greatly compromises the quality of the glass products being produced.

It is known from Patent U.S. Pat. No. 5,785,726 that containers made of platinum or platinum alloys can be protected against the creation of electrochemically formed $O_2$ bubbles by flushing with an atmosphere containing hydrogen or steam.

WO 98/18731 describes the prevention of bubble formation in the contact zones between a glass melt and platinum or molybdenum by applying a hydrogen atmosphere on the other side from the glass melt. The $H_2$ partial pressure on the outside prevents the diffusion of $H_2$ from the melt through the platinum wall.

However, the methods mentioned last require elaborate monitoring and control. On the one hand they show a large susceptibility to error and on the other hand, owing to the hazardous nature of hydrogen, they entail a high risk per se. Faults with the control and regulation lead to expensive production down times.

OBJECT OF THE INVENTION

Against this background, it is an object of the present invention to provide a device and a method for the fining of glass melts, in particular melts of glasses for optical applications, in particular for optical glasses, which substantially avoid the disadvantages of the prior art and make it possible to expel bubbles present in the melt as fully as possible and prevent reformation of oxygen bubbles as much as possible.

In particular, the method and the device should be suitable for the fining of low-viscosity glasses with optical applications, preferably optical glasses.

This comprises the aim of making it possible to fine the melt at temperatures which are higher than 1200° C. and at least reducing the use of fining agents in the glass melt, and in particular at least reducing the amount of fining agents. This is intended to at least minimize the use of toxic or at least health-endangering or ecologically problematic fining agents and substances, for example the oxides of arsenic or antimony.

It is furthermore an object of the invention to reduce attack by the melt, in particular corrosive glasses, on the melt contact surface of the wall of the fining apparatus, and increased introduction of material and ions into the glass melt due to this.

When introduction of the melt contact surface of the apparatus into the melt cannot be avoided, the material of the melt contact surface should be selected and configured so that the introduction of material into the glass melt essentially does not alter the optical properties of the glass end product, for example an optical glass element in the design of the lens. For example, compromising the transmission in the UV and/or IR range of a lens designed for the optically visible range of the electromagnetic spectrum is tolerable.

The method, and the device for carrying it out in the fining apparatus, should furthermore stabilize the convection rolls being formed and dampen the turbulences. The minimal and average residence times of the melt should be increased and a narrow residence time spectrum should be achieved. Short-circuit flows should also be minimized.

In this context, it should also be possible to influence, control and/or regulate the flow behavior so that an optimal fining result is achieved.

The method, and the device for carrying it out, should furthermore be economically viable and cost-effective to use. This comprises the aim of avoiding the use of expensive starting materials, in particular pure platinum or platinum alloys.

ACHIEVEMENT OF THE OBJECT

These objects are achieved in a surprisingly simple way by a method as claimed in claim 1 and a device for making optical glass elements as claimed in claim 32. Advantageous embodiments are the subject-matter of the respective dependent claims.

The invention provides a method for the homogenization and/or for the fining, preferably continuous fining of a melt, preferably an inorganic melt, in particular a low-viscosity glass melt in an apparatus, which defines a space for receiving the melt and an atmosphere in contact with the melt, with at least one feed and/or at least one discharge, wherein at least one section which at least partially has a melt contact surface, of the apparatus and/or of the feed and/or of the discharge comprises iridium and at least the iridium-comprising section of the apparatus and/or of the feed and/or of the discharge is at least locally heated.

In the fining procedure, the temperature of the melt is increased so that bubbles form in the melt, in particular from the gases and fining agents dissolved in the melt, and/or bubbles already present in the melt are enlarged. The bubbles ascend in the melt and pass through the melt surface into the atmosphere, which is present in the space that is defined or formed above the melt surface by the apparatus.

The composition of the atmosphere or the gas phase is not given simply by the thermodynamic equilibrium of the liquid melt and the saturated vapor in the atmosphere. The bubbles contain for example oxygen and/or gases containing oxygen, for example $CO_2$, $N_2$, $SO_2$. Rather, in an advantageous embodiment, the composition of the atmosphere above the melt surface is also set up in a defined way. In this regard, reference is made to a later part of the description.

The formation of oxygen bubbles on the melt contact surface of an apparatus, of a feed and/or of a discharge of the apparatus, from the water disassociation is also at least reduced or fully avoided by the section comprising iridium. The iridium-comprising section of the melt contact surface prevents the formation of initial oxygen bubbles in that region of the glass melt which is in contact with the melt contact surface. Bubbles emerging from the glass melt and likewise bubbles formed in the glass melt need not always contain only oxygen as a gas constituent. The oxygen contained in the bubbles may for example also be replaced by other constituents of the melt, so that the bubbles may also contain other gases, for example $CO_2$, $N_2$, $SO_2$. Said section and/or the melt contact surface of the section serves as an oxygen bubble prevention layer or bubble prevention layer. The term melt contact surface is intended to mean an interface which is in contact or touches the melt at least locally over its surface.

The active mechanism of the oxygen bubble prevention layer according to the invention, as found by the Inventors, is described extensively in the detailed description of the embodiments.

The method according to the invention makes it possible to achieve high temperatures in the melt. The fining agent contained in the melt is thereby utilized substantially better by an increased conversion ratio due to the temperature. These high temperatures also lead to an equilibrium shift of the redox conditions toward reduced species. This likewise makes it possible to employ fining agents, for example $SnO_2$, which only decompose above a temperature of 1500° C. In the same context, the use of fining agents conventionally employed at low temperatures, in particular toxic fining agents such as $As_2O_5$, can be substantially reduced.

The apparatus or the section comprising iridium is heatable, the apparatus or the section comprising iridium being conductively and/or inductively heated. The melt is essentially not heated directly, rather it is essentially or at least locally heated via the iridium-comprising section of the apparatus and/or of the feed and/or of the discharge. It is likewise possible to use additional heaters, for example for directly heating the melt, for example by electrodes arranged in the melt, or by means of radiation heating, for example by means of a burner or an electrically heated thermal radiator.

The continuous fining method is carried out in fining devices, the iridium-comprising section of the fining device or of the fining apparatus and/or its feed and/or discharge being provided with an iridium content of from about 50 wt. % to about 100 wt. %, preferably from about 90 wt. % to about 100 wt. %, particularly preferably from more than about 99 wt. % to 100 wt. %.

Another advantage of using apparatus, feeds and/or discharges made of the iridium or iridium alloys is that the viscosity of the melt is reduced by the higher temperatures which can be set up in the method according to the invention. The effect of this is that the gases released from the starting substances during the fining ascend substantially more rapidly as bubbles. This leads to an increase in the glass quality owing to considerably less bubble inclusions. The amount of fining agent used can furthermore be reduced greatly owing to an increased efficiency, which leads to a significant cost reduction.

The viscosity of the glass melt depends on the temperature of the melt and its composition. The method according to the invention and/or the device according to the invention are operated in a temperature range of from about 800° C. to 2000° C. in the melt, preferably from 1000° C. to 1800° C. In a preferred embodiment, operation is carried out at a temperature of from 1250° C. to 1600° C. At these temperatures, the low-viscosity glass melt has an approximate viscosity ç of less than about 1 dPa·s, preferably less than about 0.1 dPa·s, particularly preferably less than about 0.01 dPa·s.

In the method for the fining or continuous fining of a melt, in particular a low-viscosity glass melt, it has been found advantageous for the apparatus, in particular the iridium-comprising section of the apparatus, to be provided with at least one section which has a thermal stability of more than about 1700° C., preferably more than about 2000° C., particularly preferably more than about 2200° C. Substantially higher temperatures can be set up compared with the previously achievable temperatures, so that the viscosity of the melt is reduced and the gas bubbles ascend more rapidly.

For example, the glass melt of a lanthanum borate glass at a fining temperature of about 1400° C. already has a viscosity ç of about 0.2 dPa·s and a high rate of ascent of the bubbles with a diameter of about 0.3 mm in the melt, namely about 3.8 mm/s. This, however, can be increased further to about 17.7 mm/s when the temperature in the melt is increased to about 1600° C., and the viscosity is simultaneously reduced to about 0.01 dPa·s. On the one hand an improved fining result is thereby achieved with an increased fining temperature and the same amount of fining agent, or an equally good fining result is achieved with an increased fining temperature but a reduced amount of fining agent.

If iridium is present as an alloy, then in another advantageous embodiment the section comprising iridium is provided additionally comprising at least platinum, rhodium, palladium and/or zirconium or at least two of these elements.

According to the invention, the iridium-comprising section or region of the apparatus is provided with a thickness of from about 0.1 mm to about 10 mm, preferably from about 0.2 mm to about 5 mm, particularly preferably from about 0.3 mm to about 1 mm.

In a particularly advantageous embodiment of the method, at least those regions or cladding regions of the apparatus, particularly at least the region of the iridium-comprising section, which do not have a melt contact surface are provided with at least one encapsulation. In this way these regions of the apparatus, of the feed and/or of the discharge are protected against undesired oxidation, for example by oxygen in air, which on the one hand leads to a significantly lengthened service life of the fining device and on the other hand prevents or at least greatly reduces the otherwise possible introduction of iridium into the melt via the gas phase.

The encapsulation may be provided in the form of at least one housing, in particular made of metal and/or silica glass, and is preferably arranged on the other side of the iridium-comprising section from the melt. This protects the surface, which is not in contact with the melt, against attack by oxygen in air and therefore against oxidation. The encapsulation may also be formed by a nonconductive gastight refractory substance. In one embodiment, the housing is arranged directly on the other side of the iridium-comprising section from the melt.

In another embodiment, the housing may define a space which is delimited at least locally by the other side of the iridium-comprising section from the melt. In this case, in particular, the encapsulation may additionally be provided likewise in the form of a defined atmosphere, preferably in the form of a shielding gas atmosphere.

In an advantageous embodiment, the defined atmosphere preferably corresponds essentially to the atmosphere which is applied in the space defined by the apparatus and/or is provided in a space which is delimited at least locally by the other side of the iridium-comprising section from the melt, and the housing.

In another embodiment the defined atmosphere is provided as a reduced pressure, in particular relative to atmospheric pressure. The reduced pressure preferably has a value of less than about 1 bar, preferably less than about 0.1-0.05 bar. This promotes degassing of the melt in the apparatus. Encapsulation by a fluid, preferably as a gas, in particular by a fluid curtain, have also been found to be advantageous in experiments. Noble gases, preferably argon and/or helium, forming gas 95/5, forming gas 95/10, carbon dioxide, carbon monoxide, nitrogen, or a gas which comprises at least two of said gases, have proven to be particularly advantageous components of an inert shielding gas atmosphere. In a refinement of the invention, it is likewise advantageous to enclose the apparatus with porous packing or a porous body, and to feed a shielding gas through this. The packing/body imparts additional mechanical strength to the apparatus and protects the shielding gas atmosphere against external influences, for example air flows.

Surprisingly the apparent disadvantage of iridium, that it needs to be protected against oxidation, proves to be highly advantageous for the fining of melts. Melts are conventionally fined by the fining agents contained in them, for example $As_2O_5$, $Sb_2O_5$, $SnO_2$, $CeO_2$, evolving oxygen in a redox reaction at the high temperatures prevailing in the fining chambers, which is greatly assisted by reducing the oxygen partial pressure in the surrounding atmosphere. The gas of the defined atmosphere may in this case be provided with an oxygen partial pressure which is at least reduced relative to air.

According to the invention the method for the fining and/or continuous fining or melting of an inorganic melt, particularly a glass melt, is carried out in an apparatus which is distinguished in that the apparatus, the feed and/or the discharge is or are provided designed modularly in a plurality of pieces or designed in one piece. The one-piece version substantially avoids leaks at the junctions of the individual constituents. Furthermore the apparatus may be designed in one piece or a plurality of pieces, the feed may be designed in one piece or a plurality of pieces and/or the discharge may be designed in one piece or a plurality of pieces.

The method is advantageously carried out in an apparatus which is formed by an apparatus, a feed and a discharge, the individual parts or sections of which may be connected to one another by means of a flange connection so that they are easy to replace in the event of damage or wear. This flange connection may be provided by a ceramic seal and/or vitreous seal and/or may be cooled at least locally, which leads to longer durability of the seal. The plug-in connection may in particular additionally be cooled at least locally, so that it is preferably sealed by means of a solidified glass melt.

In one embodiment, the apparatus is formed entirely by the section comprising iridium. In another embodiment, at least subregions of the bottom and/or at least subregions of the lid and/or at least subregions of the sidewall is or are formed by the section comprising iridium. As an alternative or in addition, the bottom and/or the lid and/or the sidewall is or are formed by the section comprising iridium.

The iridium-comprising section of the apparatus may for example be provided as a bottom of the apparatus, which is essentially non-planar. The bottom is distinguished in that it is provided having an elevation relative to the bottom. This elevation may be provided with a cross section which essentially corresponds to the shape of a triangle or a semicircle and acts as a flow-influencing fitment. It is furthermore advantageous to arrange at least one flow-influencing fitment in the inorganic melt so as to achieve better mixing or homogenization of the melt in the method according to the invention, to prevent short-circuit flows and to dampen turbulences. This makes it possible to influence, in particular to regulate and/or control, the flow behavior of the inorganic melt, the glass melt.

In an advantageous embodiment of the method, regions of the apparatus, of the feed and/or of the discharge which are not in contact with the melt are provided as a refractory material, preferably a ceramic or a metal. According to a particular embodiment, the material may be provided in the form of refractory blocks; refractory ceramics, cooled non-refractory material and/or as metal, for example molybdenum. The required amount of iridium or metals comprising iridium is thereby greatly reduced, which advantageously leads to significant cost reduction.

In another advantageous embodiment of the method, regions of the apparatus such as the feed and/or the discharge, which are not attacked so strongly owing to the lower temperatures even though they are in contact with the melt, are provided as a refractory material, preferably a ceramic or silica glass. According to a particular embodiment, the material may be provided in the form of refractory blocks, refractory ceramics, cooled non-refractoty material and/or cooled or non-cooled silica glass. The required amount of iridium or metals comprising iridium is thereby greatly reduced, which advantageously leads to significant cost reduction.

In an advantageous embodiment of the invention the apparatus, in particular the bottom and/or the lid and/or the sidewall, the feed and/or the discharge is or are at least locally heated and/or cooled, as a result of which defined temperatures can be set up at the various regions of the apparatus so that the flow behavior of the melt is expediently influenced, preferably controlled and/or regulated by a temperature profile being produced. The apparatus, in particular the lid and/or the sidewall, and/or the sections of the sidewall in the region of the three-phase boundary and/or the sections of the sidewall in the region above the melt contact, and/or the end walls may be at least locally cooled so that a skull crust of intrinsic material is formed on the melt contact surface.

The invention furthermore comprises a device for carrying out a method for the fining or continuous fining of an inorganic melt, preferably a low-viscosity glass melt in an apparatus, which defines a space for receiving the melt and an atmosphere in contact with the melt, with at least one feed and/or at least one discharge, wherein at least one section which at least partially has a melt contact surface, of the apparatus and/or of the feed and/or of the discharge comprises iridium.

The device is distinguished in that the iridium-comprising section has an iridium content of about 50 wt. % to about 100 wt. %, preferably from about 90 wt. % to about 100 wt. %, particularly preferably from more than about 99 wt. % to 100 wt. %.

Besides the aforementioned advantage of the reduced oxygen bubble formation at iridium-comprising sections, iridium or alloys containing iridium advantageously have a substantially higher chemical stability in relation to glass melts than do the noble metal platinum or platinum alloys. The heat-bearing capacity is furthermore substantially higher than that of platinum or platinum alloys. The components comprising iridium may be heated up to a temperature of about 2200° C. in contact with glass melts. Advantageously, the attack by the glass melts on the metal is extremely small even at these high temperatures. In small amounts, furthermore, iridium dissolved in the glass has no substantial effect in the visible wavelength range of electromagnetic radiation. If the iridium is present as an alloy, then the section comprising iridium has at least platinum, radium, palladium and/or zirconium or at least two of these elements as further constituents.

In a particularly advantageous embodiment, the apparatus is formed entirely by the section comprising iridium. In another advantageous embodiment, at least subregions of the bottom and/or at least subregions of the lid and/or at least subregions of the sidewall is or are formed by the section comprising iridium. As an alternative or in addition, the bottom and/or the lid and/or the sidewall is or are formed by the section comprising iridium.

The heating of the melt in the apparatus may be carried out by means of direct radiation heating, for example of a burner or an electrically heated thermal radiator, indirect radiation heating by conductive heating and/or inductive heating of the iridium section/sections and/or direct conductive heating of the melt via electrodes. According to the invention, conductive or inductive heating of the apparatus or of the section comprising iridium has been found to be particularly advantageous. The inductor geometry and tuned circuit frequency are in this case adapted to the corresponding geometry of the apparatus. Typical frequencies lie in the medium-frequency range 8-50 kHz. It is likewise possible to heat the iridium sections with radiofrequency of the order of magnitude of about 100 kHz to about 2 MHz, and this may prove necessary for particular geometries and designs.

If the apparatus is designed so that a skull crust of intrinsic material is formed on the melt contact surface in coolant-cooled sections, then these sections in one embodiment according to the invention comprise at least one metal and/or a metal alloy as a material, particularly as a material of the melt contact surface, or they even consist of a metal and/or a metal alloy. Possible materials in this case comprise for example noble metals (particularly iridium), stainless steel, aluminum and/or an aluminum alloy. Said materials are to be interpreted as examples and are in no way restricted to said selection.

Accordingly the sidewall is designed to be at least locally cooled or coolable, for example by means of a fluid flowing through a cavity arranged in the wall. The temperature of the cooled sidewall in this case has a value lower than about 500° C., preferably lower than 250° C., particularly preferably lower than about 120° C. Owing to the cooling of the glass contact surfaces, the melt freezes on the surface of the cooled components of the apparatus and an interlayer of intrinsic material is formed, which substantially prevents attack of the material by the melt.

In another embodiment, the apparatus has a cover or lid which is at least locally cooled, for example by means of a fluid, in particular air, or is uncooled. Possible materials of the cover comprise a ceramic, in particular a refractory ceramic.

A defined atmosphere may in this case be applied in a space formed between the melt surface, the sidewalls of the apparatus and the cover. In order to assist the process of fining the melt, a reduced pressure may for example be applied in the space which is formed. In order to substantially avoid the oxidation of iridium- or iridium alloy-based components for example, an atmosphere of a shielding gas, in particular nitrogen, argon, helium or forming gas (95/5 or 90/10) may be introduced into the space. The evolution of oxygen by the fining agents present in the melt may furthermore be promoted by reducing the oxygen partial pressure in the atmosphere of the space. The defined atmosphere may also per se or additionally be a reducing atmosphere, for example in order to reduce iron of valency state +3 present in the melt from valency state +3 to +2. Iron in valency state +2 has no substantial effect on the properties in the visible optical range.

The high fining temperatures and the low oxygen partial pressure in the glass melts lead to a shift of the redox equilibria not only for the fining agents but also for all other polyvalent ions contained in the melt. These polyvalent ions, usually for the most part iron and chromium ions, are typical contaminants in glass raw materials or are introduced into the melt during the production process. The higher oxidation states $Fe^{3+}$ and $Cr^{6+}$ lead to a significant and intense discoloration of the glasses in the visible range than the lower oxidation states of the ions $Fe^{2+}$ and $Cr^{3+}$. In particular, $Fe^{3+}$ leads to discolorations in the visible range and $Cr^{6+}$ is furthermore highly toxic.

In a preferred embodiment in which the sidewalls are cooled fully or at least above the glass line and a skull crust of intrinsic material is formed and the cover consists of a cooled or uncooled ceramic, or a cooled metal, oxidizing conditions may also be set up in the atmosphere space above the melt, in particular an air atmosphere or an atmosphere containing oxygen, since there is no direct contact with iridium in this region.

An oxidizing is important particularly for materials and glasses which themselves are susceptible to reduction, for example phosphate-containing, germanate-containing, stannate-containing, bismuth-containing and lead-containing melts. Here, an accurate window between fining and reduction should be maintained.

For further features of the device according to the invention, reference may be made to the description of the method according to the invention.

The device and the method according to the present invention are suitable in particular for the fining and/or homogenization of glasses for optical applications, in particular optical glasses such as for example borate and lanthanum borate glasses, phosphate glasses, heavy metal phosphate glasses, fluoride-phosphate glasses, fluoride glasses, aluminate glasses, but also borosilicate glasses, zinc silicate glasses, aluminosilicate glasses, aluminoborosilicate glasses, bismuth- and germanium-containing glasses or glasses with a low proportion of polyvalent ions, in particular with an ion content of less than 0.01 wt. %. Said glasses are employed for example in optical imaging and illumination systems, optical systems for data transmission, optical systems for data storage, optical filter systems, systems for light transmission and/or display applications, in optical glass elements. The glasses and applications mentioned here are to be interpreted as examples and are in no way restricted to said selection.

The invention furthermore comprises a product, in particular a glass, preferably an optical glass, which is producible or in particular produced by the method according to the invention or by means of the device according to the invention.

In respect of the glasses which may be fined or homogenized with the aid of the invention, particular advantages are achieved since they are distinguished by a particularly low bubble content.

The glass has inclusion of bubbles with a bubble diameter of less than about 25 µm, preferably less than about 10 µm, particularly preferably less than about 5 µm. A bubble content of said order of magnitude and/or bubbles with said dimensions have a virtually negligible effect on the optical properties of an optical element produced by the device according to the invention.

The bubble inclusion is established by means of a visual inspection. The glass is placed with a lower side on a black background and illuminated from the side. The glass is observed from the upper side of the glass in the direction of the black background. The bubbles are visible as bright points. The size of the bubbles is measured.

Besides a low bubble content, the products and/or glasses produced by the method according to the invention or by means of the device according to the invention are advantageously distinguished by an at least reduced proportion of toxic substances and substances which are for concern for health or ecologically, for example arsenic compounds. The glass is therefore particularly health-compatible and may for example be used as bioglass.

The glass has an arsenic content of less than about 0.3 wt. %, preferably less than about 0.03 wt. %, particularly preferably less than about 0.005 wt. %, an antimony content of less than about 0.5 wt. %, preferably less than about 0.1 wt. %, particularly preferably less than about 0.025 wt. % and/or a lead content of less than about 0.1 wt. %, preferably less than about 0.01 wt. %, particularly preferably less than about 0.005 wt. %. It may therefore be categorized as health-safe. Owing to the reduced content of platinum-containing wall material with the melt, the glass is distinguished in that it has a platinum content of less than about 50 ppm, preferably less than about 20 ppm, particularly preferably less than about 10 ppm. Owing to the contact of the iridium-containing layer with the melt during the method, the glass is distinguished by an iridium content of from about 10 ppm to about 500 ppm, preferably from about 1 ppm to about 100 ppm, particularly preferably of from less than about 2 ppm to about 20 ppm. This leads to glasses which have only slightly modified spectral properties in the visible range owing to the low platinum content. Advantageously, the iridium content has scarcely any effect on the spectral properties of the products or glasses.

The glass is furthermore distinguished in that for a pure transmissivity ô$_i$ in a range of about 50%, the glass has a shift of from 5 nm to 50 nm, preferably from 5 nm 20 nm, particularly preferably 8 nm to 15 nm toward shorter wavelengths relative to an essentially identical glass which is fined in a device consisting essentially of platinum. This results in an improved transmission in the lower visible range of the electromagnetic spectrum. The term essentially identical glass is intended to mean a glass which is essentially produced by the same starting substances. The term device consisting essentially of platinum refers to a device which has a platinum content of more than about 80 wt. %.

Tests carried out by the Inventors show a detectable platinum input of 9 ppm into glasses which have been incubated at a temperature of 1480° for 1 hour in a crucible made of PtIr1 alloy, while no iridium was detectable in the glasses. In a melt which was incubated under the same conditions in an iridium crucible, 4 ppm of iridium were detectable in addition to 0.3 ppm of platinum. These comparative experiments unequivocally reveal that substantially less material erosion from the crucible wall takes place when using iridium as a melt contact material, and less metallic constituents or ions are therefore detectable in the product.

The substances mentioned above essentially have their origin in the use of corresponding fining materials or as a constituent of the wall, which come or comes in contact with the melt and can be detected in the product or glass owing to the material introduction, or input, in the product.

The quality of the glass can thereby be increased even more, since no introduction of the likewise coloring platinum or platinum ions into the glass takes place. By using such an iridium-based fining method, advantageous transmissions and bubble qualities can be achieved while simultaneously minimizing the use of fining agents.

The present invention will be described in detail below with the aid of exemplary embodiments; the features of the different exemplary embodiments may be combined with one another. To this end, reference is made to the appended drawings. In the individual drawings, references which are the same relate to parts which are the same.

FIG. 7 schematically shows the diffusion-inhibiting effect of a wall containing iridium.

FIG. 8 schematically shows the diffusion of hydrogen through a platinum Wall.

Figure 1:
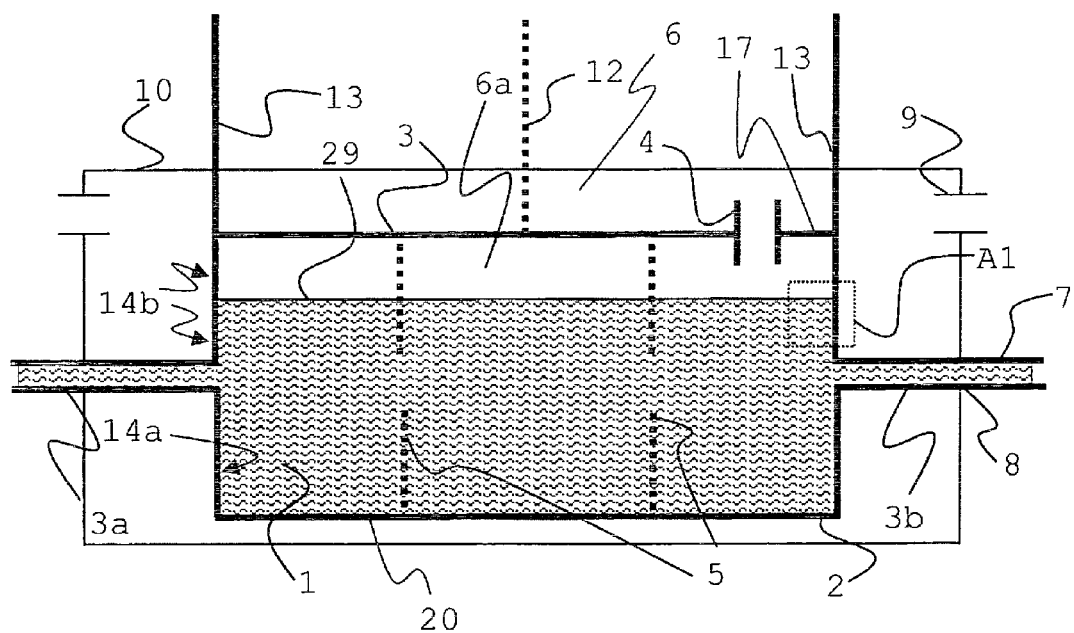
FIG. 1 shows by way of example a schematic representation of a conductively heated, fully encapsulated Ir fining chamber with or without flow fitments.
Figure 9:
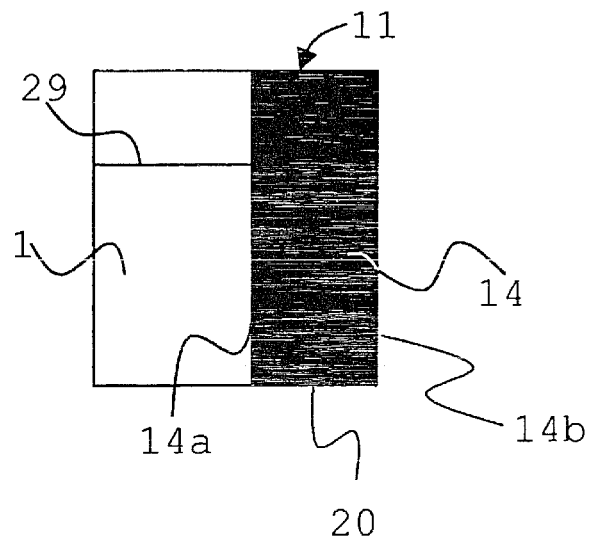

FIG. 9 shows a schematic detailed view of the excerpt A1 from FIG. 1 with an exemplary embodiment of a one-layered system.

Figure 10:
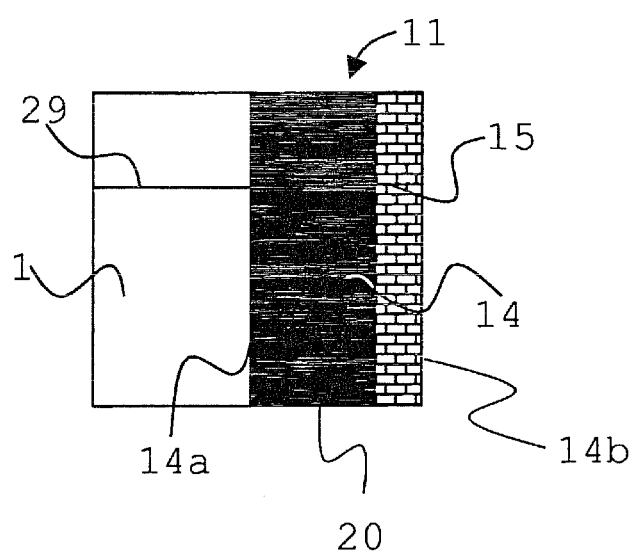

FIG. 10 shows a schematic detailed view of the excerpt A1 from FIG. 1 with an exemplary embodiment of a two-layered system.

Figure 11:
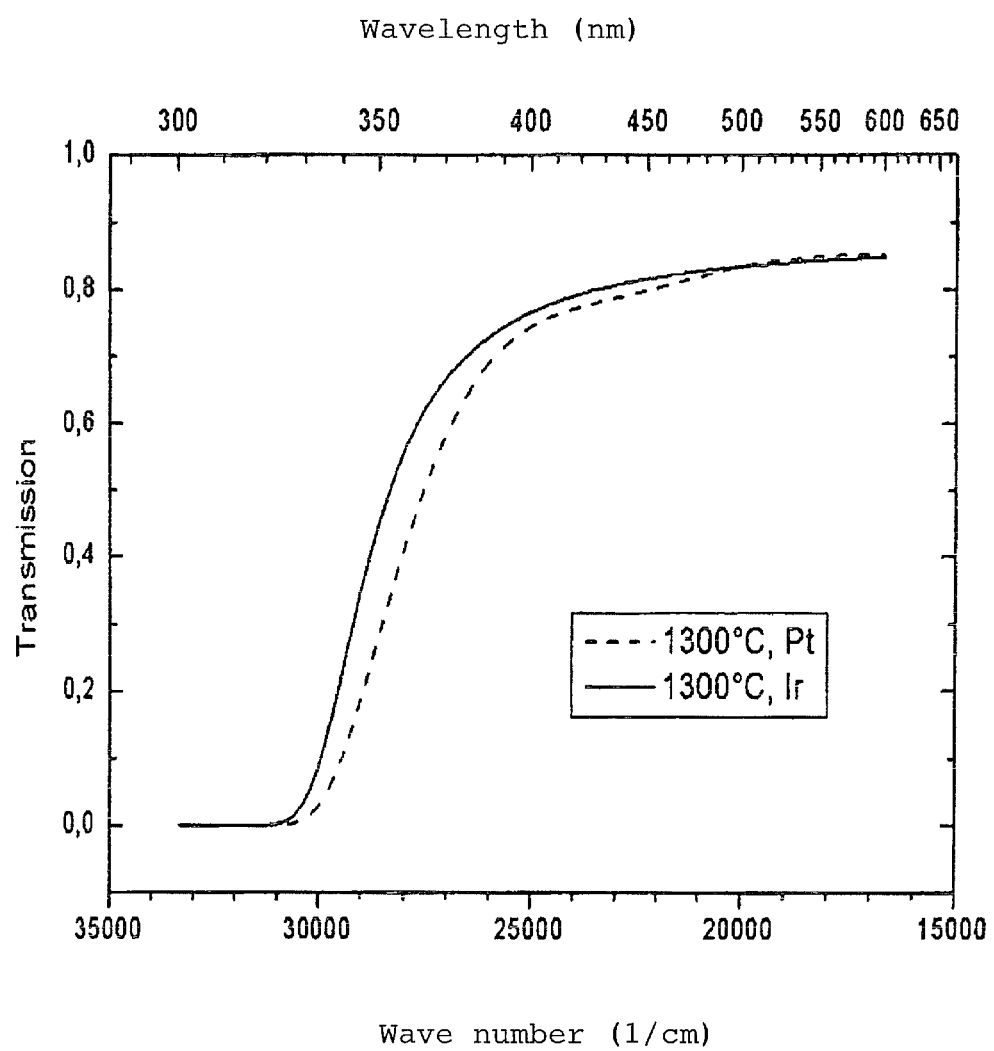

FIG. 11 shows the pure transmissivity $ô_i$ of a lanthanum borate glass in the lower visible range of the optical spectrum as a function of the wavelength.

DETAILED DESCRIPTION OF THE FIGURES

In further comparative measurements between iridium and platinum parts, the Inventors could for the first time show that the barrier effect of iridium against hydrogen diffusion allows prevention of the bubble formation at the interface between the melt and the glass. This effect could not be established when using platinum tubes and disks. Bubbles were in this case observable at the interface between the metal and the melt, which unequivocally reveals that platinum in contrast to iridium is at least more hydrogen-permeable.

Another effect of iridium, which may be discussed based on the test results obtained, is the possibility of forming iridium(IV) oxide $IrO_2$ at high temperatures, which likewise leads to reduced oxygen bubble formation at the interface between the bubble prevention layer comprising iridium. The oxygen formed in the melt by thermal decomposition of the water becomes bound in the form of $IrO_2$ to the boundary layer comprising iridium, which can advantageously likewise lead to prevention of the formation of bubbles at the interface between the glass and the melt.

The fining apparatus 3 represented in FIGS. 1 to 5 may have any desired cross sections in their configuration, preferably round, oval or angled, in particular polygonal cross sections. The length and cross section are dictated according to the glass viscosity and the throughput to be fined. Conventional dimensions for melt quantities of about 0.5-2 t/d are volumes of about 5-15 l with diameters of about 60-200 mm and lengths of about 1000-1500 mm.

Figure 2:
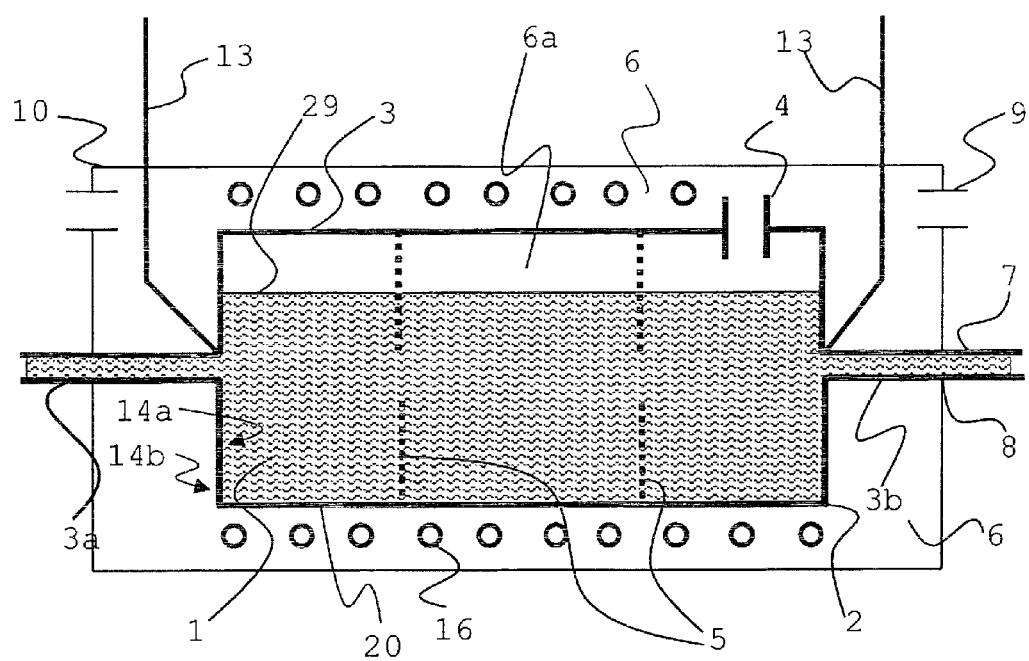
FIG. 2 shows by way of example a schematic representation of an inductively heated, fully encapsulated Ir fining chamber with or without flow fitments.

The fining chambers 3 represented in FIGS. 1 and 2 have a comparable structure. Except where different features are explicitly pointed out, the following comments relate both to FIG. 1 and to FIG. 2. They respectively show a schematic representation of a fully encapsulated fining chamber 3 or a fining chamber 3 with a feed 3a and a discharge 3b, which comprises at least iridium as a material. The iridium-containing materials which are mentioned in laid-open specifications WO 2004/007782 A1, JP 10259435 A, U.S. Pat. No. 3,970,450 A1, U.S. Pat. No. 4,253,872 A1, U.S. Pat. No. 5,080,862 A1, EP 732416 B1, DE 3301831 A1, U.S. Pat. No. 6,071,470 A1, U.S. Pat. No. 3,918,965 A1 and U.S. Pat. No. 6,511,632 B1 have been found to be particularly advantageous.

The fining chambers or the fining apparatus 2 shown in FIGS. 1 and 2 are constructed entirely from the section 20 comprising iridium. This means that the section 20 comprising iridium forms the sidewall 18, the bottom 19 and the lid 17 of the apparatus 2. The iridium-comprising section 20 or the apparatus 2 has a melt contact surface 14a and a side 14b remote from the melt. The apparatus 2 defines a space for receiving the melt 1 and an atmosphere 6a which is in contact with the melt 1.

FIG. 1 shows a fining chamber 3 conductively heated via the flanges 13, which are designed here as an iridium-comprising section 20 or as an iridium-containing wall of the fining chamber 3, and via an optional flange 12, while the fining chamber represented in FIG. 2 is inductively heated by means of the coil 16 arranged around the fining chamber 3.

The melt 1, or the glass melt 1, enters the fining chamber from the side through the feed 3a and emerges from it through the discharge 3b. The fining chamber 3, or its feed 3a and discharge 3b, are connected via the components 7 made of platinum and/or platinum alloys to the respective feeding devices, for example a melting crucible, or discharging devices, for example a homogenization or transport device. Inside the fining chamber 3, flow fitments or flow-influencing fitments 5, so-called shets, are arranged in the melt 1 or in the flow of the melt 1. However, the use of shets is optional.

The fining chamber 3, or the fining chamber 3 with a feed 3a and discharge 3b, may be manufactured by welding so that it comprises a completely welded part. It may however also be constructed so that parts of the fining chamber 3, or the fining chamber 3 with a feed 3a and discharge 3b, are plugged into one another and the plug-in connections are sealed against leakage of glass using ceramic or vitreous seals, or so that they are cooled in such a way that a melt freezes and forms a seal.

Figure 3:
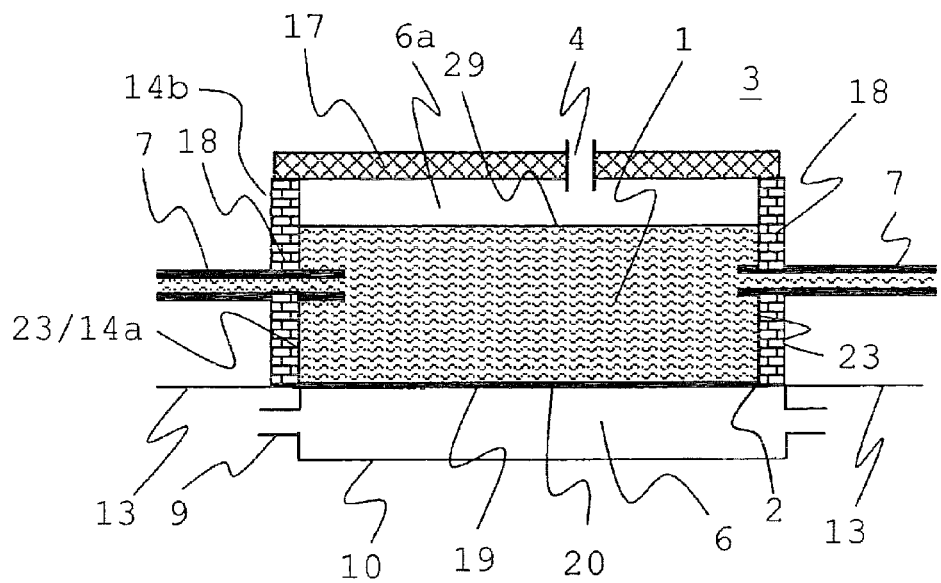
FIG. 3 shows by way of example a schematic representation of a hybrid fining chamber conductively heated via the Ir bottom with cooled end faces and cooled sidewalls.
Figure 4:
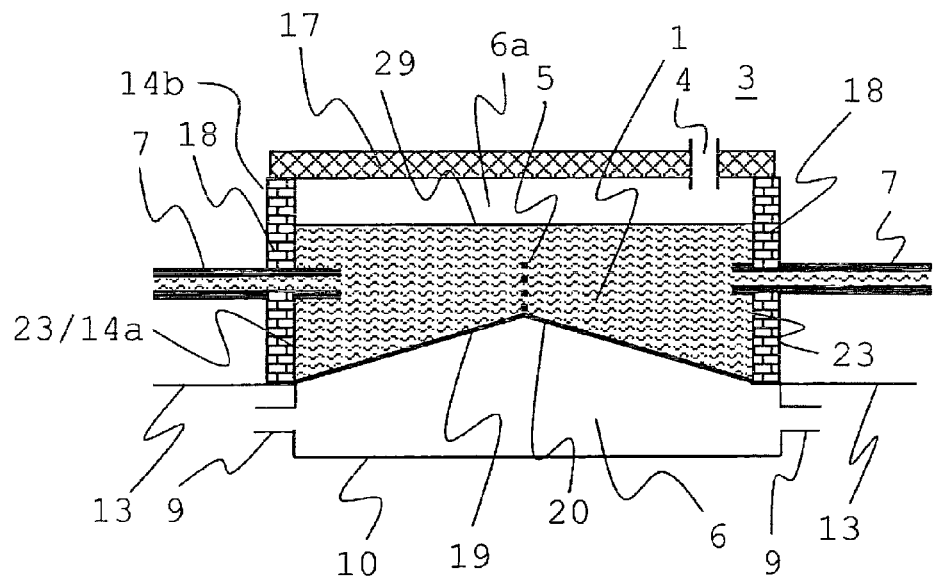
FIG. 4 shows by way of example a schematic representation of a hybrid fining chamber conductively heated via an angled Ir bottom, with or without flow fitments.
Figure 5:
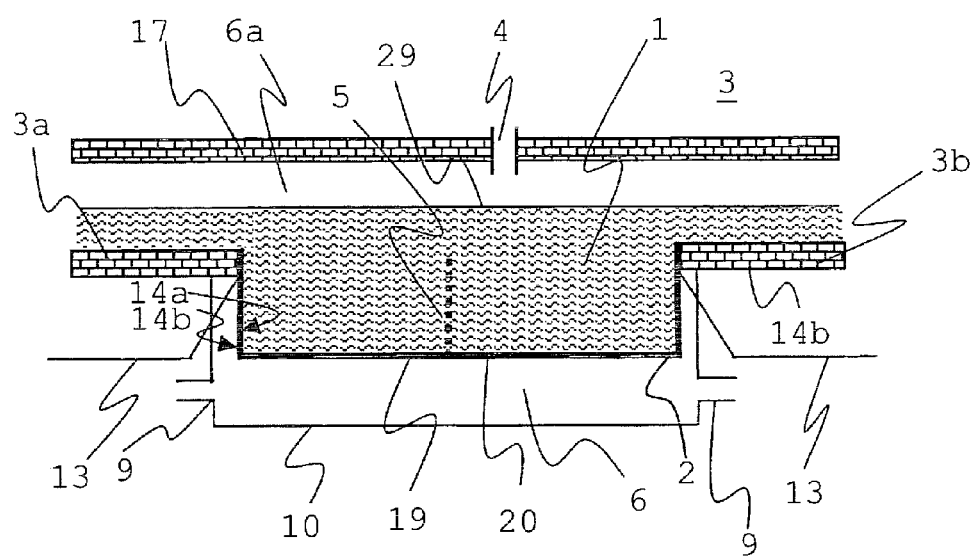
FIG. 5 shows by way of example a schematic representation of a hybrid fining chamber conductively heated via the Ir bottom, with feeds and discharges made of refractory material.

In order to prevent oxidation of the fining chamber 3 or the iridium-containing components of the fining chamber 3 by the oxygen present in the air, the fining chamber 3 is arranged inside encapsulation 10, which is designed here for example as a chamber. The encapsulation 10 has a gas feed 9 or, as represented, a gas feed and discharge 9. The fining chamber 3 has a venting tube 4 above the melt surface 29, through which it establishes a spatial connection with the space produced by the encapsulation 10, in which there is a defined atmosphere 6. A preferred material for forming the encapsulation 10 is for example a nonmagnetic refractory treated steel, which absorbs only little of the electromagnetic radiation used for the heating. By applying a defined atmosphere 6 inside the encapsulation 10, which contains a forming gas, for example 90% nitrogen and 10% hydrogen, or an inert gas, for example argon, on the one hand oxidation of the iridium-containing components of the fining chamber 3, of the feed 3a and of the discharge 3b can be prevented, and on the other hand the evolution of oxygen in the melt 1 can be reinforced by reducing the oxygen partial pressure in the melt. FIGS. 3, 4 and 5 respectively show by way of example a schematic representation of a fining chamber 3 designed as a hybrid. The fining chambers 3 represented have a structure comparable to the fining chambers 3 represented in FIGS. 1 and 2. Except where different features are explicitly pointed out, the following comments relate to all of FIGS. 3, 4 and 5. The heating of the fining chamber 3, or the hybrid fining chamber 3, is carried out directly via the flange 13 which touches the iridium-containing bottom 19 of the fining chamber. As already described correspondingly, the iridium-containing bottom 19 is enclosed by means of the encapsulation 10 and a defined non-oxidizing, preferably inert atmosphere 6. The fining chamber 3 has a venting tube 4 above the melt surface 29. Thus a defined atmosphere 6 may be applied in the space of the melt surface 29 and lid 17, or the normal air atmosphere may act.

The fining chamber 3, or the hybrid fining chamber 3, is configured so that at least parts of the sidewall 18 or wall and/or the lid 17 or the wall 18 and/or the lid 17 or cover plate consist of non-heated refractory materials or is or are actively cooled. Materials for the lid 17 are refractory, melt atmosphere-resistant and passively dissolving refractory ceramics, for example quartzal i.e. a silicon-rich ceramic, or mullite. For the wall or sidewall 18 or for a cooled wall or sidewall 18, on the other hand, refractory, atmosphere-resistant and passively dissolving refractory ceramic, for example quartzal or a zirconium silicate, represents a suitable material. The refractory ceramic is advantageously distinguished in that it does not affect the optical properties of the glass and does not constitute crystallization seeds.

Owing to the cooling of the sidewall 18, a protective layer of intrinsic material is formed on the side facing the melt 1 or on the surfaces of the sidewall 18 which are in contact with the melt 1, i.e. a layer of frozen or solidified glass melt 24 which prevents direct attack by the melt 1 on the wall material.

Surprisingly, it has been found that by actively fluid-cooled, for example water-cooled, continuous walls or sidewalls 18, the flow profile of the melt 1 in the fining chamber 3 can be modified so as to stabilize the convection rolls being formed, even in the case of low-viscosity glasses. The average residence time of the melt 1 in the fining chamber 3 is increased and at the same time so-called short-circuit flows of the melt 1 through the fining chamber 3 are prevented. The term short-circuit flows of the melt 1 is intended to mean flows or regions of the melt 1 which have a short dwell time in the fining chamber 3 so that only insufficient fining of these regions can be achieved.

The incorporation of sometimes elaborately designed flow-influencing fitments 5, represented as optional fitments 5 in FIGS. 1 and 2, for influencing the flow is therefore superfluous. On the other hand owing to the active media-cooled, in particular continuous sidewalls 18, the particularly stressed 3-phase melt/fining chamber/atmosphere boundary lies in the called region. The melt 1 is frozen there, i.e. the 3-phase boundary comprises melt/glass/atmosphere and no attack on the fining chamber material takes place. A third advantage of this design is the possibility that the defined, inert or reducing atmosphere 6 in the region above the melt surface 29 and inside the fining chamber can be obviated, although it does not have to be omitted. Merely the iridium-containing bottom region 19 of the fining chamber needs to be protected externally against oxidation. This design is advantageous for all glasses which require oxidizing conditions, for example glasses containing lead, silver or bismuth. These oxidizing conditions may be produced in the atmosphere 6a above the melt surface 29.

In a variant of this hybrid or mixed form of the fining chamber 3 made of an iridium-containing bottom 19 and water-cooled walls or sidewalls 18, in order to assist the fining and homogenization, prevent short-circuit flows and improve the stability of the convection cells, flow-influencing fitments 5 are arranged in the melt 1 and/or the bottom 19 is provided having an elevation. The bottom represented in FIG. 4 is for example angled, or has a triangular cross section. The desired flows can thereby be expediently assisted.

In the variant of the hybrid and mixed form of the fining chamber 3 as represented in FIG. 5, the feed and discharge 3a and 3b are made of refractory material and are open to the atmosphere space at the top. The fining chamber 3 represented has an iridium-comprising section 20. In the present case, this forms the bottom 19 and at least a part of the sidewall. The iridium-comprising section 20 or the apparatus 2 has a melt contact surface 14a and a side 14b remote from the melt. In the embodiment represented in FIG. 5, the apparatus 2 defines a space to receive a melt 1 and a space for an atmosphere 6a which is in contact with the melt 1. The apparatus is conductively heated via a flange 13. The iridium-comprising section 20 of the fining chamber 3 or the exposed other side 14b of the iridium-comprising section 20 from the melt is arranged inside encapsulation 10, in order to avoid oxidation of the iridium-comprising sections of the fining chamber 3. The encapsulation 10 has a gas feed 9, or as represented a gas discharge and gas feed 9, and it protects in particular the iridium-comprising sections 20 of the fining chamber 3 by applying a defined non-oxidizing, preferably inert atmosphere 6. The fining chamber 3, or the hybrid fining chamber 3, is constructed so that at least the feed 3a and the discharge 3b are open at the top and comprise non-heated refractory blocks. The melt 1 flows with a free melt surface via the feed 3a into the apparatus 2, through the apparatus 2 and out of the apparatus via the discharge 3b. Materials for the lid 17 are refractory, melt atmosphere-resistant and passively dissolving refractory ceramics, for example quartzal i.e. a silicon-rich ceramic, or mullite. The fining chamber 3 furthermore has at least one venting tube 4, through which a defined atmosphere 6a can be applied in the region between the melt surface 29 and the lid 17. In order to prevent short-circuit flows and to improve the stability of the convection cells, the fining chamber 3 at least one flow-influencing fitment 5 is optionally arranged in the melt 1, so that the fining is improved even further.

Figure 6:
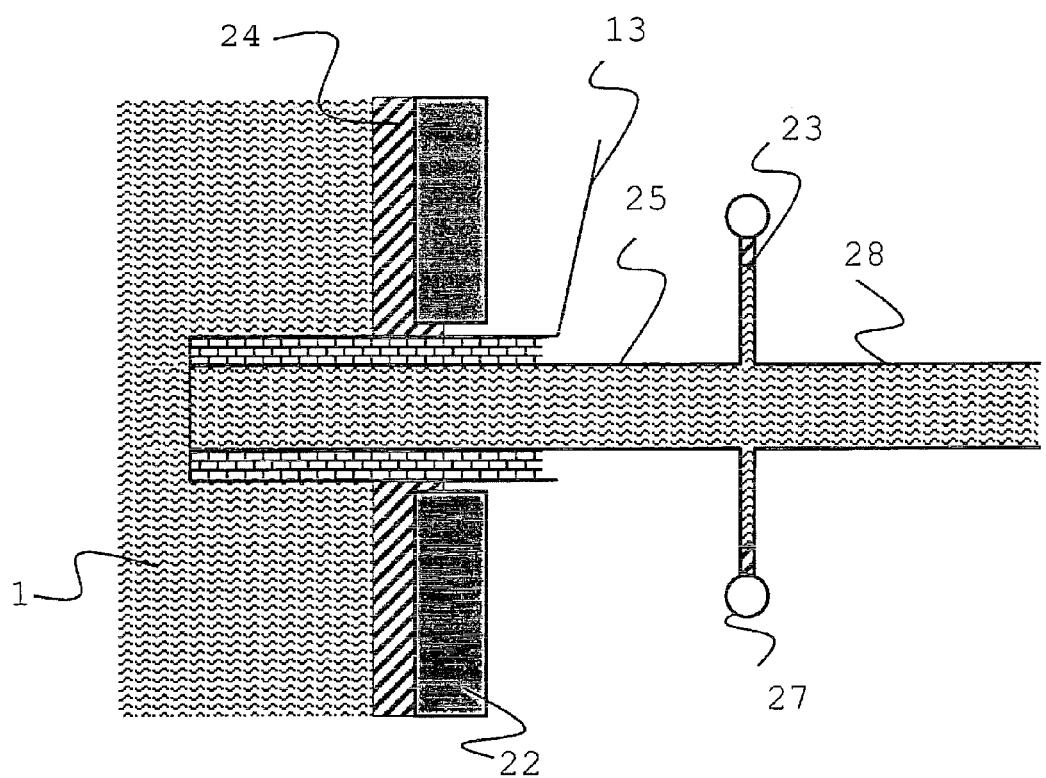
FIG. 6 shows by way of example a schematic representation of the connection of a feed and discharge to the cooled hybrid fining chamber.

The connection of the feed and/or discharge to a coolant-cooled end wall of a fining chamber hybrid system is schematically in FIG. 6. Here, the connection is configured similarly to patent application DE 103 297 18 A1. On the other hand, a junction from components comprising iridium or platinum to upstream and/or downstream platinum or iridium systems is likewise possible. This junction may be formed by direct welding of iridium and platinum or platinum alloys. In this case, however, it is also usually necessary to insert the connections into one another since iridium-platinum welds do not have a sufficiently high mechanical strength. FIG. 6 shows two further embodiments of a junction by way of example.

In the junction between the cooled end wall of the fining apparatus 18 and an extraction system 25 made of iridium or platinum, conductively heated via the flange 13, the local cooling of the wall of the fining apparatus is used so that the melt 1 freezes or solidifies. The glass melt 23 frozen at this position advantageously forms a seal at the junction between the wall of the fining apparatus 18 and the extraction system 25.

In a second example, the junction between the extraction system 25 made of iridium or platinum and the tube 28 made of platinum or platinum alloys is produced by flanging together the two components to be connected. The effect of the coolant-cooled ring seal 27 is that the glass melt 1 freezes 23 at the flange position between the two tubes, so that a vitreous seal is formed at the flange position. In a particular embodiment of the invention, the use of ceramic or vitreous seals at the flange position is likewise advantageous.

A similar procedure is used when fitting iridium-comprising fining chambers to melting apparatus made of refractory, ceramic/vitreous materials and skull systems. The connection between these elements may be established via a platinum insert, or by direct flanging with washer disks or coolers.

Figure 7A:
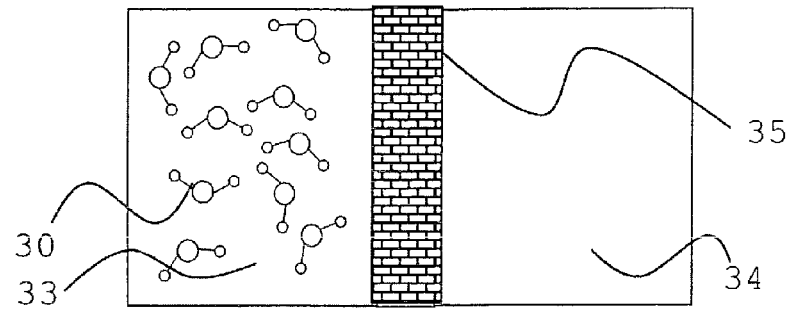
Figure 7B:
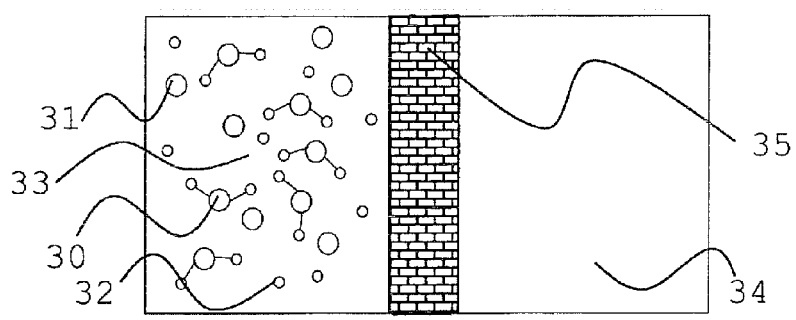
Figure 7C:
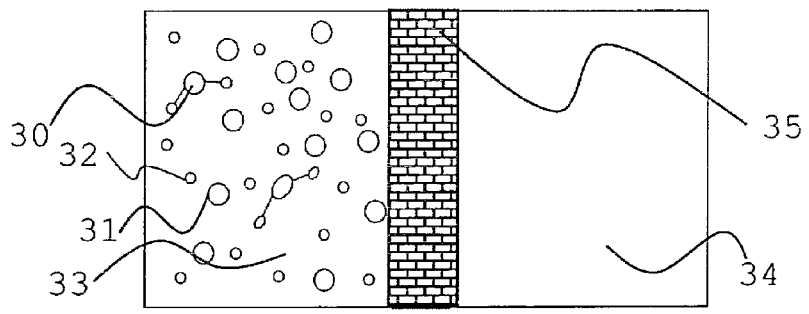
Figure 7D:
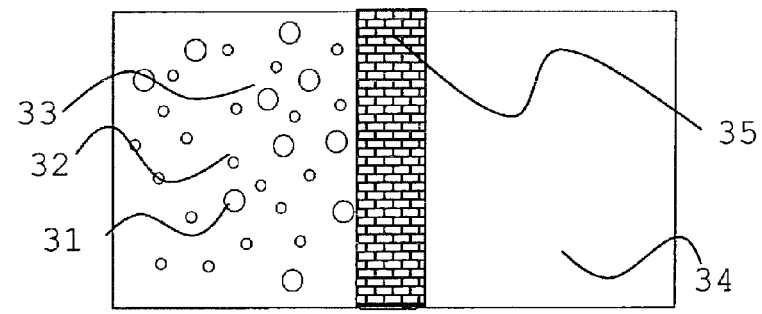
Figure 8A:
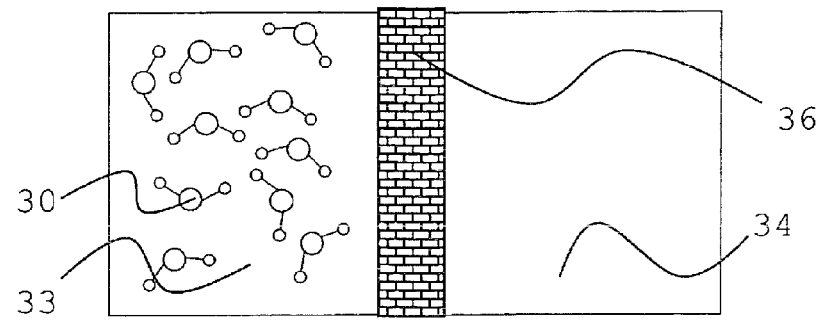
Figure 8B:
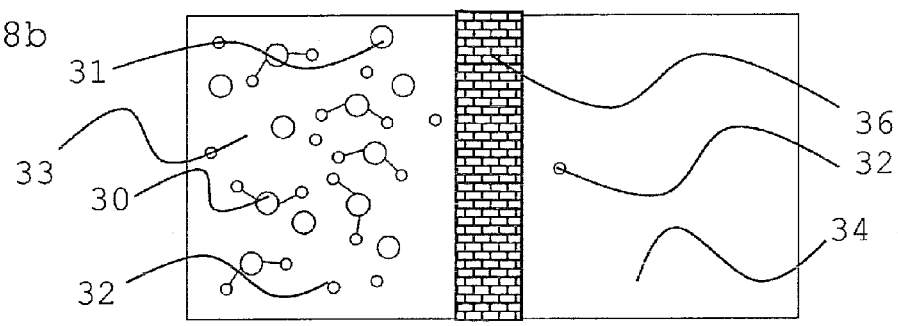
Figure 8C:
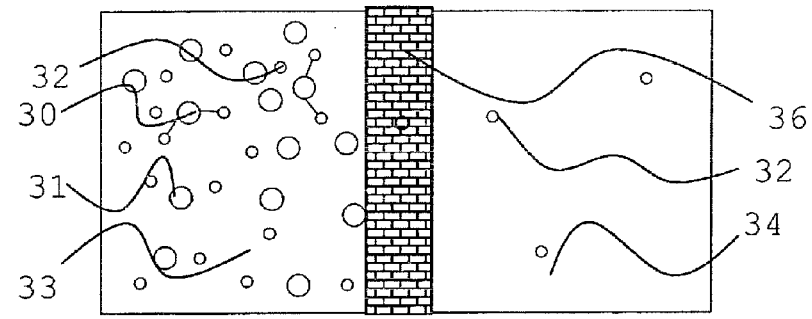
Figure 8D:
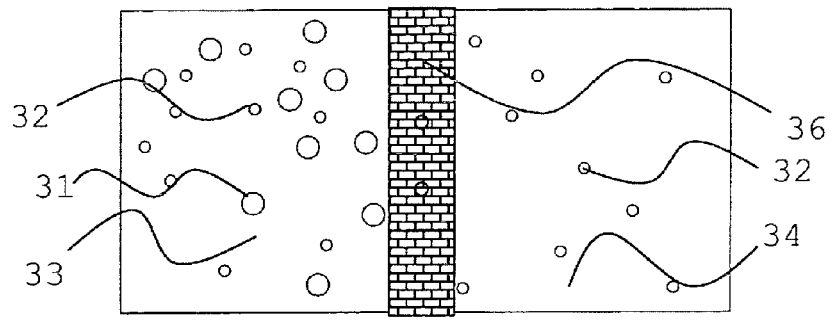

FIGS. 7a to 7d schematically show the mechanism of the oxygen diffusion inhibition by iridium components. FIGS. 7a to 7d show that the thermal decomposition of water 30 contained in the melt increases with increasing temperature from FIGS. 7a to 7d; thus, the proportion of water dissociated at 2000° C. is about 1%. In FIG. 7d, where the temperature is highest, the water 30 is dissociated to a greater extent into nitrogen 32 and oxygen 31. The high density of the wall 35 made of iridium-comprising material prevents diffusion of nitrogen from the interior 33 into the exterior 34, through a wall 35 made of material comprising iridium.

FIGS. 8a to 8d represent the diffusion of hydrogen through a metal component, for example a platinum wall. FIGS. 8a to 8d show that the thermal decomposition of water 30 contained in the melt increases with increasing temperature from FIGS. 8a to 8d. As may be seen from FIG. 8b, the onset of hydrogen diffusion through the platinum wall 35 occurs immediately after the start of the thermal cleavage of the water 30 into oxygen 31 and hydrogen 32. Since platinum is permeable for hydrogen 32, which is highly volatile after passing through, a concentration equilibrium is not set up on the two sides of the wall 35. The surplus oxygen 31 remaining in the interior 33 causes the formation of bubbles when the melt cools.

FIG. 9 shows an exemplary embodiment of the present invention. The wall 11 represented is in this case designed as a one-layered system. This one-layered system is formed by the iridium-comprising section 20 or the melt contact layer 14, which is in direct contact with the melt 1 by its melt contact surface 14a. Consequently, the melt contact layer 14 also fulfils the carrying or supporting function of the wall 11. In other words, the wall 11 consists of iridium or an iridium alloy with said properties. A thermally, chemically and mechanically stable wall 11 made of iridium in this case has a thickness of from about 0.1 mm to about 2 mm, preferably from about 0.5 mm to about 1.2 mm, while a thickness of from about 800 µm to about 3000 µm has been found to be advantageous for a wall with said constituents of an iridium alloy.

FIG. 10 shows an exemplary embodiment of the wall 11 as a two-layered system, or as a 2-layer system. The wall 11, or a section of the wall 11, comprises the melt contact layer 14 and a carrier layer 15, which is arranged on the other side of the melt contact layer 14 from the melt. Alternatively, the melt contact layer 14 is arranged on the carrier layer 15. The carrier layer 15 is assigned both a supporting or carrying function and a protective function. This comprises on the one hand the advantage that the iridium-comprising melt contact layer 14, which is not oxidation-resistant against the oxygen of the ambient air above a temperature of about 1000° C., is protected by the carrier layer 15 against oxidation.

FIG. 11 shows the results of the study of the pure transmissivity $ô_i$ of a lanthanum borate glass as a function of the wavelength in the lower visible range of the optical spectrum. The glass was respectively fined in an apparatus made of platinum and an apparatus made of iridium at about 1300° C. It may be seen clearly that in the region represented, in particular from about 320 nm to about 500 nm, the glass which was fined in the iridium apparatus has an increased and therefore improved transmission compared with the glass which was fined in the platinum apparatus. Considered another way, there is therefore a shift of the curves. For a pure transmissivity $ô_i$ in a range of from about 20% or 0.2 to about 80% or 0.8, the shift has a value of from about 8 nm to about 22 nm toward shorter wavelengths. Variation of the glass may cause an absolute shift of the two curves. The relative spacing of the two curves, however, is expected to be essentially as represented in FIG. 11.

The references stand for the following components:
1 melt or glass melt
2 apparatus
3 fining chamber
3a feed
3b discharge
4 venting tube
5 flow-influencing fitment
6 defined atmosphere
6a atmosphere with melt contact
7 component made of platinum and/or platinum alloys
8 sealed Ir—Pt junction position at the encapsulation
9 gas feed or discharge
10 encapsulation
11 wall
12 optional flange for direct electrical heating
13 flange
14 melt contact layer
14a melt contact surface
14b side remote from melt
15 carrier layer 16 induction coil
17 lid
18 sidewall
19 bottom
20 section comprising iridium
22 cooled ring seal
23 coolant-cooled wall
24 solidified glass melt
25 extraction system
27 coolant-cooled ring seal at the connection flange
28 tube made of iridium
29 melt surface
30 water molecule
31 oxygen atom
32 hydrogen atom
33 interior
34 exterior
35 wall made of iridium-comprising material
36 platinum wall

The invention claimed is:

1. A method for the continuous fining of a glass melt (1), the method comprising:
providing an apparatus (2) which defines a space for receiving the melt (1) and an atmosphere (6a) in contact with the melt (1), with at least one feed (3a) positioned at a side of the apparatus (2) and at least one discharge (3b), the glass melt (1) entering the apparatus (2) from the side through the feed (3a), wherein at least one section (20) of the apparatus (2) and/or of the feed (3a) and/or of the discharge (3b) at least partially has a melt contact surface (14a), and wherein the section (20) comprises iridium, the iridium-comprising section (20) being provided with an iridium content of from about 50 wt. % to about 100 wt. %; and
heating at least the iridium-comprising section (20) of the apparatus (2) and/or of the feed (3a) and/or of the discharge (3b), wherein the apparatus (2) and/or the feed (3a) and/or the discharge (3b) is or are at least locally cooled so that a solidified glass melt (24) is formed which prevents direct attack by the melt (1) on the wall material.

2. The method as claimed in claim 1, wherein the iridium-comprising section (20) is conductively and/or inductively heated.

3. The method as claimed in claim 1, wherein the iridium-comprising section (20) is provided with an iridium content of from about 90 wt. % to about 100 wt. %.

4. The method as claimed in claim 1, wherein the iridium-comprising section is provided additionally comprising at least platinum, rhodium, palladium and/or zirconium.

5. The method as claimed in claim 1, wherein the apparatus (2) is provided at least locally with a thermal stability of more than about 1700° C.

6. The method as claimed in claim 1, wherein a region of the melt (1) is heated to a temperature of about 800° C. to about 2000° C.

7. The method as claimed in claim 1, wherein at least one region of the iridium-comprising section (20) does not have a melt contact surface (14a) and wherein that region of the iridium-comprising section (20) is provided with at least one encapsulation (10).

8. The method as claimed in claim 7, wherein the encapsulation (10) is provided with at least one housing and is arranged on the other side (14b) of the iridium-comprising section (20) from the melt.

9. The method as claimed in claim 7, wherein the encapsulation (10) is provided by means of a defined atmosphere (6).

10. The method as claimed in claim 9, wherein the defined atmosphere (6) corresponds essentially to the atmosphere (6a) which is applied in the space defined by the apparatus (2) and/or in a space which is delimited at least locally by the other side (14b) of the iridium-comprising section (20) from the melt.

11. The method as claimed in claim 9, wherein the defined atmosphere (6, 6a) is provided as a reduced pressure.

12. The method as claimed in claim 9, wherein the defined atmosphere (6, 6a) is provided by means of a fluid.

13. The method as claimed in claim 12, wherein the fluid is provided as a gas with an at least reduced oxidizing effect.

14. The method as claimed in claim 12, wherein the defined atmosphere (6, 6a) is provided as a shielding gas.

15. The method as claimed in claim 1, wherein the apparatus (2) and/or the feed (3a) and/or the discharge (3b) is or are provided in one piece.

16. The method as claimed in claim 1, wherein the apparatus (2) and/or the feed (3a) and/or the discharge (3b) is or are provided designed modularly in a plurality of pieces.

17. The method as claimed in claim 16, wherein the individual sections of the apparatus (2) are welded together and/or at least partially connected to one another by means of a plug-in connection.

18. The method as claimed in claim 17, wherein the plug-in connection is sealed by means of a ceramic seal and/or vitreous seal.

19. The method as claimed in claim 17, wherein the plug-in connection is at least locally cooled and sealed by means of a solidified glass melt (23).

20. The method as claimed in claim 1, wherein at least one section of a bottom (19) of the apparatus (2) is provided essentially non-planar.

21. The method as claimed in claim 20, wherein the elevation is provided with a cross section which essentially has the shape of a triangle and/or a semicircle.

22. The method as claimed in claim 1, wherein the apparatus (2) is entirely formed by the section (20) comprising iridium.

23. The method as claimed in claim 1, wherein at least subregions of the bottom (19) and/or at least subregions of the lid (17) and/or at least subregions of the sidewall (18) is or are formed by the section (20) comprising iridium.

24. The method as claimed in claim 1, wherein the bottom (19) and/or the lid (17) and/or the sidewall (18) is or are formed by the section (20) comprising iridium.

25. The method as claimed in claim 1, wherein a section of the apparatus (2) not in contact with the melt (1) is provided made of a substance which at least comprises a refractory material, and which is a ceramic or a metal.

26. The method as claimed in claim 25, wherein the refractory material is provided in the form of refractory blocks, a refractory ceramic, a cooled non-refractory material and/or as a metal.

27. The method as claimed in claim 1, wherein the apparatus (2) and/or the feed (3a) and/or the discharge (3b) is or are at least locally heated.

28. The method as claimed in claim 1, wherein at least one flow-influencing fitment (5) is arranged in the glass melt (1).

29. The method as claimed in claim 1, wherein the flow behavior of the glass melt (1) is influenced.

* * * * *

UNITED STATES PATENT AND TRADEMARK OFFICE
CERTIFICATE OF CORRECTION

PATENT NO. : 8,661,852 B2
APPLICATION NO. : 12/160866
DATED : March 4, 2014
INVENTOR(S) : Leister et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1410 days.

Signed and Sealed this

Twenty-ninth Day of September, 2015

Michelle K. Lee
*Director of the United States Patent and Trademark Office*